United States Patent [19]

McLaughlin, Jr. et al.

[11] 3,895,687

[45] July 22, 1975

[54] ACOUSTIC IMPULSE GENERATOR

[75] Inventors: Joseph K. McLaughlin, Jr., Rochester; Dennis R. Courtright, Canandaigua, both of N.Y.

[73] Assignee: Hydroacoustics, Incorporated, Rochester, N.Y.

[22] Filed: June 26, 1974

[21] Appl. No.: 483,262

[52] U.S. Cl. .................... 181/120; 187/113; 92/29
[51] Int. Cl.² .......................................... G01V 1/04
[58] Field of Search ........ 181/110, 119, 120; 92/20, 92/29

[56] References Cited
UNITED STATES PATENTS

| | | | |
|---|---|---|---|
| 3,277,437 | 10/1966 | Bouyoucos | 181/120 |
| 3,433,202 | 3/1969 | Sharp et al | 181/120 |

*Primary Examiner*—Maynard R. Wilbur
*Assistant Examiner*—H. A. Birmiel
*Attorney, Agent, or Firm*—Martin Lukacher

[57] ABSTRACT

Apparatus for generating high energy impulses or acoustic transients when submerged under water is described. A piston is moved against the external water pressure head to an outward position by rollers which are pivotally mounted on latch arms and which engage a cam surface at the rear of the piston. When the piston reaches the outward position, the rollers are pivoted by a trip bar which travels with the rollers to the outward position. The rollers then ride over the cam surface; thus releasing the piston to travel over a return stroke to a rearwardly disposed anvil. The energy of the water head is converted to kinetic energy of a moving column of water as the piston is accelerated rearwardly on the return stroke. The moving column of fluid is suddenly decelerated when the piston impacts the anvil; thus, converting the kinetic energy of the moving fluid column into an acoustic impulse or transient in the form of a shock wave which is radiated outwardly into the surrounding water. A shock absorber and dampers are associated with the anvil to bring the piston gently to rest after impact.

14 Claims, 10 Drawing Figures

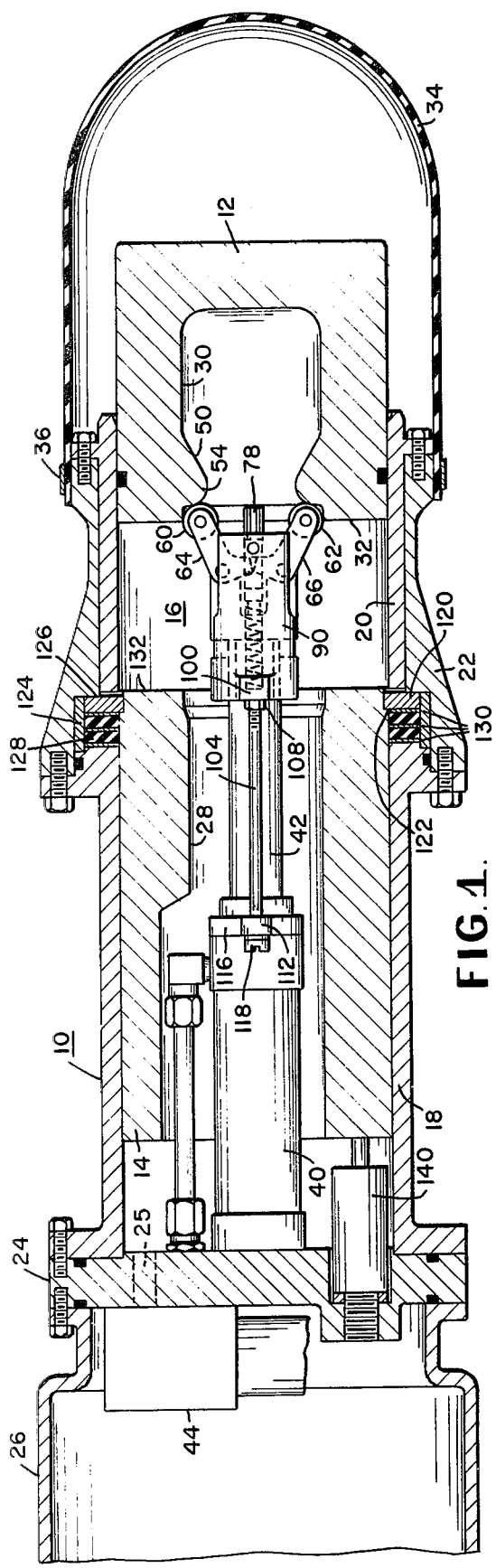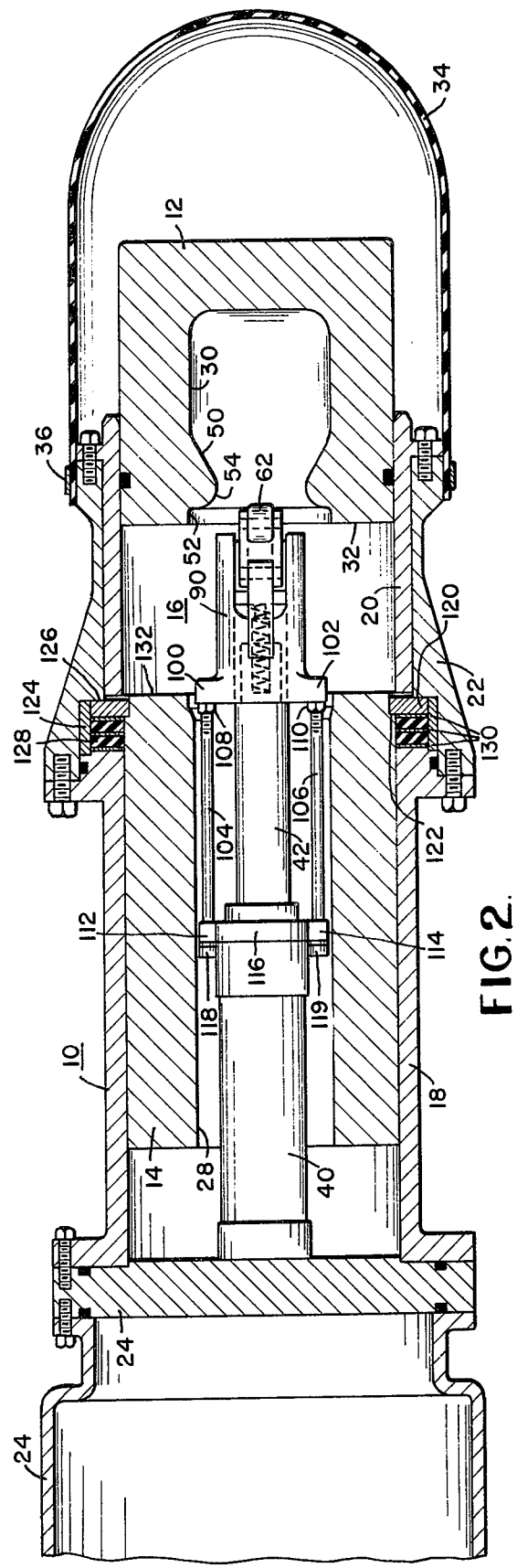

ACOUSTIC IMPULSE GENERATOR

The present invention relates to apparatus for generating acoustic impulses or transients in an underwater environment and particularly to improved mechanisms for thee actuation and control of acoustic apparatus which converts the energy of underwater pressure heads into acoustic signals.

The present invention is especially suitable to use in marine seismic exploration and in sonar signal generation. Features of the invention may also be found useful generally in the actuation and control of apparatus in underwater environments.

Acoustic apparatus for producing acoustic impulses by converting the potential energy available under water into kinetic energy and then into acoustic impulses has been described in U.S. Pat. No. 3,277,437, issued on Oct. 4, 1966 to John V. Bouyoucos. In such apparatus a piston is actuated against the force due to the underwater pressure head and clamped in a cocked position. Upon firing, the piston is released and allowed to return until it comes rapidly to a stop against an anvil. An acoustic impulse is then generated and acoustic signals are propagated in the form of shock waves into the water. A high energy short duration impulse or transient is thereby produced. Ease of actuation, cocking, clamping and firing such that impulses may be rapidly generatd is both necessary and desirable in such acoustic impulse generators. Since the generators may be submerged for long periods of time, reliability is also of principal importance. Various techniques for actuation and control of acoustic impulse generators have been suggested. The above-referenced patent describes hydraulic and pneumatic actuation and control techniques. Hydraulic and pneumatic techniques are also described in U.S. Pat. No. 3,610,366. Mechanical controls are described in U.S. Pat. No. 3,642,090. Other pneumatic and hydraulic controls and actuation techniques are described in U.S. Pat. Nos. 3,642,089; 3,670,839; and 3,721,311. All such techniques have drawbacks arising from complexity of design, prolonged recycling time between firings or shots, and otherwise from reduced reliability.

Accordingly, it is an object of the present invention to provide an improved acoustic impulse generator having improved actuation and control action.

It is a further object of the present invention to provide an improved acoustic impulse generator which is capable of generating acoustic impulses and transients in an underwater environment at a rapid rate.

It is a still further object of the present invention to provide an improved acoustic impulse generator with high efficiency of operation.

It is a still further object of the present invention to provide an improved underwater acoustic impulse generator having a simple, reliable and efficient mechanism which operates both to cock and to fire the generator.

It is a still further object of the present invention to provide an improved acoustic impulse generator in which undesired motions such as rebounds of the impulse generating element are substantially eliminated.

Briefly described, an acoustic impulse generator in accordance with the invention is adapted to be submerged under water and has a housing in which a piston is mounted for reciprocal movement. The pressure in the housing is lower than the pressure of the surrounding medium and a mechanism is provided for moving the piston against the pressure of the medium and then releasing the piston to generate an acoustic impulse as the piston is accelerated to impact against an anvil. The mechanism for moving the piston includes a driver, such as a hydraulic cylinder, which executes forward and return strokes. Roller means are pivotally mounted as at the end of the driver for engaging the piston and moving it to an outwaard position at the end of the forward stroke. The rollers are pivotally mounted and are disposed for engagement with a surface of the piston during the forward stroke. Release means which may be movable with the rollers are operative when the driving means moves to the outward position for pivoting the rollers so that the rollers move off the piston surface and release the piston to execute the return stroke under the pressure of the medium. The piston then accelerates until impact with the anvil. As a result, an acoustic impulse and shock wave which radiates into the medium is generated.

The anvil may have associated therewith a shock absorber which biases the anvil against a stop to locate the anvil at the impact position. Separated rearwardly from the impact position by a gap is a body of damping material. When the piston impacts the anvil, the anvil moves rearwardly somewhat exposing damping means including the resilient damping material, which when engaged by the piston, gently brings the piston to a stop. The driving means and rollers are then retracted such that the rollers can again engage the surface of the piston and rapidly drive the piston in the forward direction so as to permit another impulse to be generated. Impulses may then be generated, and firings or shots of acoustic impulses can recur at a rapid rate.

The foregoing and other objects and advantages of the present invention will be more apparent from a reading of the following description in connection with the accompanying drawings in which:

FIG. 1 is a longitudinal sectional view showing an acoustic impulse generator embodying the invention;

FIG. 2 is a view similar to FIG. 1 with the section being taken at 90° with respect to the section taken in FIG. 2;

Figure 3:
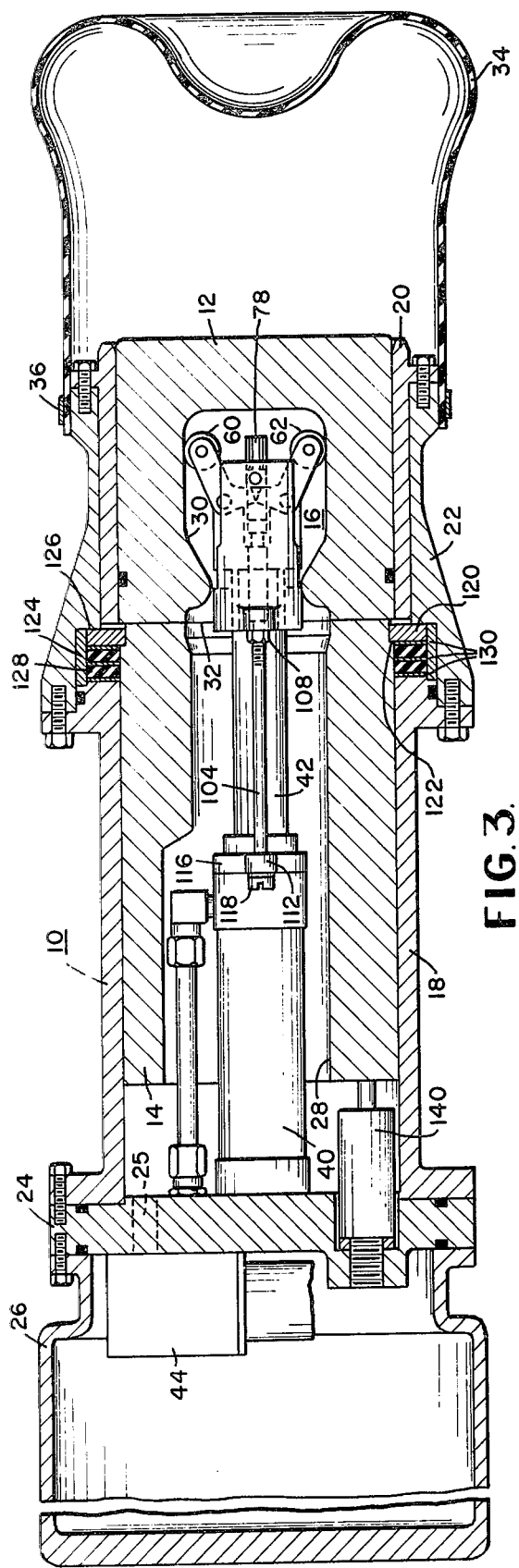
FIG. 3 is a view similar to FIG. 1 with the piston of the generator disposed at impact position.
Figure 5:
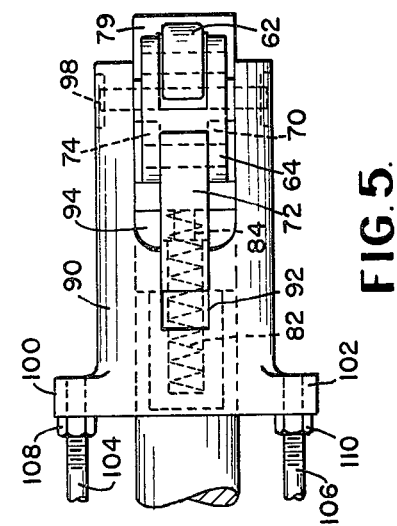
FIG. 5 is a fragmentary view of the forward portion of the actuation and control mechanism of the impulse generator shown in FIGS. 1 through 4.

Referring more particularly to FIGS. 1 and 2, there is shown an acoustic impulse generator which is adapted to be operated under water, say in the sea. The generator has as its principal components, a housing 10, a piston 12, an anvil 14, and an actuation and control mechanism 16. The housing 10, piston 12 and anvil 14 are all generally cylindrical. The housing 10 includes an anvil housing 18 to which a piston guide 20 is attached by a jacket 22. The actuation and control mechanism 16 is attached to a rear wall 24 of the anvil housing. A manifold housing section 26 is attached to the back of the rear wall 24. The anvil 14 has an axial opening 28 through which the actuation and control mechanism 16 extends. The piston 12 also has a blind axial opening 30 which extends into the rear wall 32 of the piston. A boot 34 which is attached to the jacket 22 by a clamp 36 extends outwardly from the forward end of the housing. The boot 34 may be made of rubber or other elastrometric material. Various bolts are used to assemble the housing and seals are provided by O rings.

The actuation and control mechanism 16 includes a hydraulic cylinder 40 from which a driving member 42, which may be the piston operated by the cylinder 40, extends. Hydraulic fluid for operating the cylinder is applied thereto as from an external pump via a valve 44 by way of a conduit 46. The piston 42 of the hydraulic cylinder 40 is shown extended in FIGS. 1 and 2. The hydraulic cylinder 40 may be operated electrically or mechanically. The cylinder may be equipped with electrically operated valves which are controlled by wiring connected to the cylinder. Alternatively, switches may be provided for operating these valves when the piston 42 is in its fully extended and fully retracted positions, respectively, for admitting fluid from the valve 44 into the cylinder 40 to cause the piston rod 42 to execute the forward and return strokes. In such event, the impulse generator will repetitively re-cycle and produce a succession of acoustic impulses.

The rear wall 24 may have one or more holes 25 therein so as to communicate the manifold housing 26 with the other internal portions of the housing 10. Inasmuch as the total volume within the housing 10 changes depending upon the position of the piston 12, the enlarged area of the manifold housing 26 provides for such volume changes being small as compared to the total volume within the housing. The pressure within the housing is thus maintained relatively constant. Since the housing is sealed, this pressure will be maintained below the pressure of the water in which the generator is submerged. In the event that the generator is operated at variable depths or close to the surface, it may be desirable to provide means for maintaining the pressure within the housing at a constant differential pressure relative to ambient water pressure, as by pumps or by the use of pressurized containers such as are used in conventional scuba gear.

Figure 10:
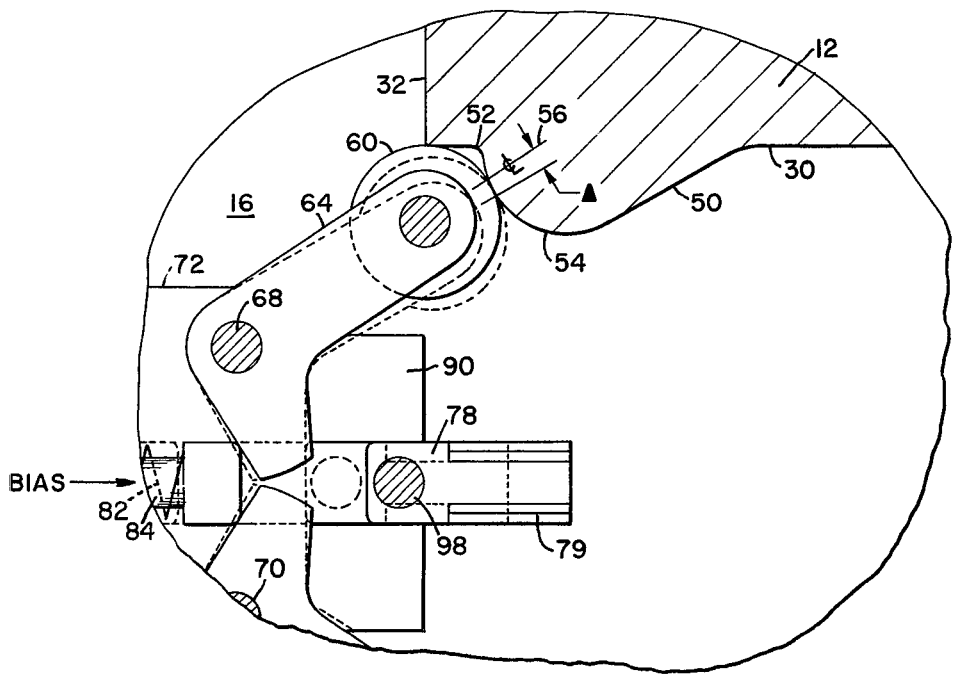
FIG. 10 is an enlarged, fragmentary, diagrammatic view which illustrates the operation of the actuation and control mechanism shown in FIG. 1 through 9.

The periphery of the axial hole 30 in the piston 12 is provided with a cam surface 50 which is shown in greater detail in FIG. 10. This surface 50 includes a concave surface portion 52 and a convex portion 54. A center line 56 separates the concave and convex portions 52 and 54. The actuation and control mechanism 16 cooperates with this cam surface 50 for actuating and controlling the piston along its forward and return strokes.

The forward portion of the actuation and control mechanism 16 is illustrated in FIGS. 5 through 9. Its major constituents are a pair of rollers 60 and 62 which are mounted on L shape or crank-type links 64 and 66 which are referred to hereinafter as latch arms. These latch arms are pivotally mounted by pins 68 and 70 in a latch carrier 72 which is attached by being screwed into the forward end of the hydraulic cylinder piston 42 (see FIG. 9). The latch arms 64 and 66 are bifurcated and extend into grooves 74 and 76 in a trip bar 78 which is slidably mounted in a slot 80 in the latch carrier 72. The trip bar 78 is biased in a forward direction by a compression spring 82 which is located in a hole in the latch carrier and encircles a pin 84 at the rear end of the trip bar 78. During the forward stroke, the trip bar 78 is biased in the forward direction by the spring 82 as shown in FIG. 10. The trip bar then spring loads the latch arms 64 and 66 so that they pivot outwardly to the postion shown in full lines in FIG. 10.

Slidably mounted around the latch carrier 72 is a trip carrier 90. The trip bar 78 also extends through a slot 92 in the trip carrier 90 which is coextensive with the slots 80 in the latch carrier 72. The latch carrier 72 also extends through a lateral slot 94 in the trip carrier 90 and the sides of the latch carrier as well as the latch arms and rollers mounted thereon all extend through this slot 94. Damping material, such as rubber or felt pads 79, are attached to the sides of the trip bar 78 for damping any impact of the rollers 60 and 62 against the bar 78.

A pin 98 extends through the trip carrier 90 and through the trip bar 78. The trip carrier 90 is therefore spring loaded in the forward direction by the spring 82. The rear end of the trip carrier 90 has a pair of ears 100 and 102. Secured in these ears 100 and 102 are a pair of rods 104 and 106. The forward ends of these rods 106 may be threaded and screwed into correspondingly threaded holes in the ears 100 and 102. Nuts 108 and 110 hold the rods firmly in place. The rods 104 and 106 extend rearwardly in an axial direction along the hydraulic cylinder piston 42 and pass through bushings 112 and 114 in a collar 116 which is rigidly attached to the cylinder 40. The rear ends of the rods 104 and 106 are enlarged as by having heads 118 and 119 therein. The heads of these screws are larger than the openings in the bushings 112 and 114.

The anvil 14 is held at an impact position by a stop ring 120 which engages a shoulder 122 near the forward end of the anvil 14. The stop ring is maintained in position by a short tube 124 disposed in the jacket 22 and by a shoulder 126 of the jacket 22. A plurality of pads in the form of circular rings 128 of resilient material such as rubber felt are disposed between the stop ring 120 and the anvil housing 18. Narrow rings 130 of hard material, such as brass, may be disposed between the pads 128. Accordingly, the stop ring 120 can move in a rearward direction compressing, during such movement, the pads and rings 128 and 130. When the anvil is in its forward position as shown in FIGS. 1 through 4, the forward end of 132 of the anvil projects slightly, say approximately 0.02 inch beyond the forward face of the stop ring 120 to define a gap 134, as shown in detail in FIG. 4.

The anvil 14 is biased in a forward direction by yieldable means which is shown as a shock absorber 140. Two of such shock absorbers 140 may be used at diametrically opposite positions. These shock absorbers 140 may be of the type used in automotive applications and may be preloaded with compressed fluid so as to normally urge the anvil forwardly to the impact position (viz., where the shoulder 122 engages the stop ring 120, devices sold by Taylor Devices, Inc., of N. Tonawanda, N.Y. being suitable).

Figure 4:
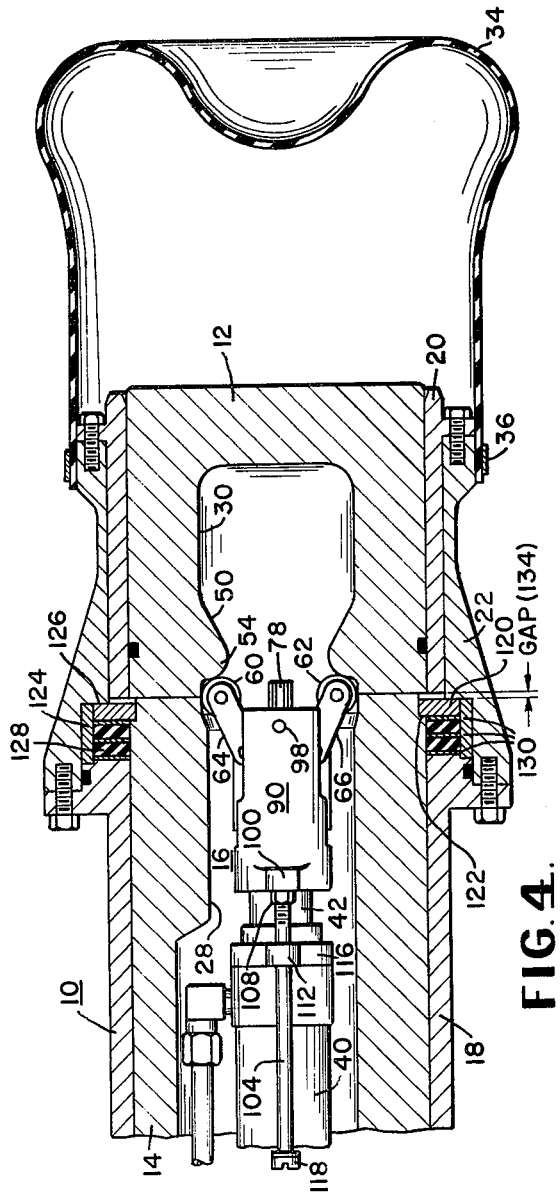
FIG. 4 is a fragmentary sectional view similar to FIG. 3 showing the impulse generator at the beginning of the firing cycle.
Figure 6:
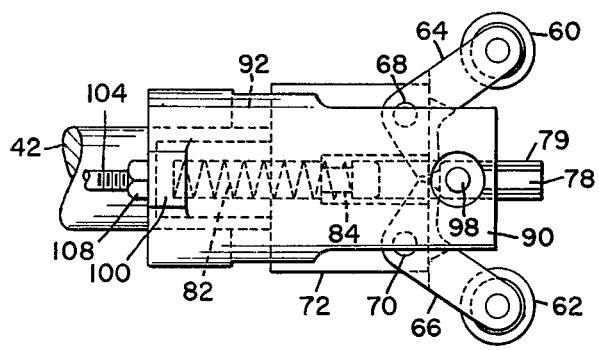
FIG. 6 is a view of the portion of the mechanism shown in FIG. 5 taken from the bottom as viewed in FIG. 5.
Figure 7:
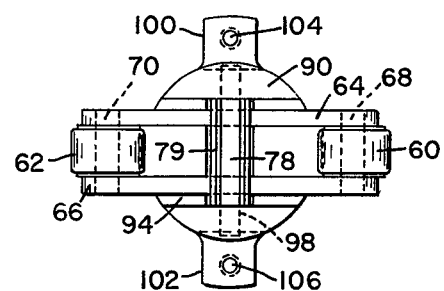
FIG. 7 is a right end view of the portion of the mechanism shown in FIG. 5.
Figure 8:
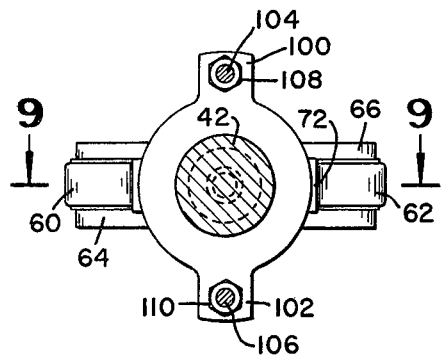
FIG. 8 is a left end view of the mechanism shown in FIG. 5.
Figure 9:
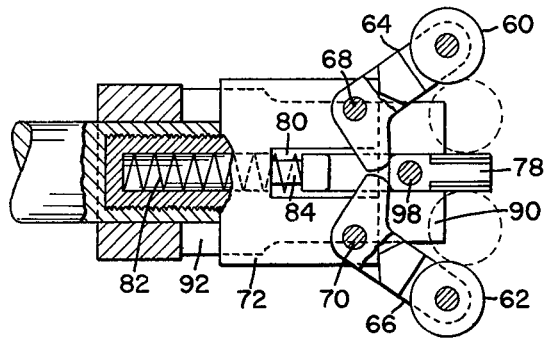
FIG. 9 is a fragmentary sectional view of the mechanism shown in FIGS. 5 to 8, the section being taken along the line 9—9 in FIG. 8.

At the beginning of each impulse generation cycle the piston 12 is disposed against the anvil in the position shown in FIG. 4. The trip rods 104 and 106 extend well beyond the bushings 112. The trip bar 78 is spring loaded outwardly to the position shown in full lines in FIG. 10 and pivots the latch arm 64 to bring the rollers 60 and 62 into the concave portion of the cam surface 50. The piston 42 of the hydraulic cylinder 40 is then extended and the piston 12 is driven forwardly by the driving force from the hydraulic cylinder which is transmitted through the latch arms 64 and 66 and the rollers to the piston 12.

FIGS. 1, 2 and 5 through 8 show the generator and the actuating mechanism 16 in the cocked or firing position (viz, the position just before firing occurs). Then the piston has been driven a predetermined distance dictated by the length of the trip rods 104 and 106. When this distance on the forward stroke is reached, the trip rods are stopped by their enlarged ends 118 and 119 engaging the collar 116 in which the bushings 114 and 112 are located. The trip carrier 90 then stops, as does the pin 98 and the trip bar 78. The hydraulic cylinder 40, however, continues driving in the forward direction. Since the trip bar 78 stops, the latch arms 64 and 68 are pivoted inwardly towards the axis of the piston and into the opening 30. Only a slight movement over the center line 56 (see FIG. 10) a distance indicated as Δ which may be about 0.05 inch, is required. The continued driving motion of the hydraulic cylinder piston 42 and the latch carrier coupled with the force applied in the rearward direction by the water pressure head against the forward face of the piston, cause the arms to cam and toggle over the convex region 54 of the cam surface 50 and into the opening 30 to the position shown in FIG. 3.

The piston accelerates under the force due to the pressure head causing the boot 34 to collapse somewhat, as shown in FIGS. 3 and 4. The piston arrested abruptly by the anvil at the impact position. The anvil moves rearwardly, the shock absorbers 140 absorbing a large part of the impact force. The piston 12 rebounds slightly and then moves rearwardly again under the pressure head due to the surrounding water. The forward face of the stop ring 120 is then exposed to the rear end 32 of the piston. The damping action of the pads 128 and rings 130 is then operative to gently bring the piston to rest against the stop ring 120. The piston is finally moved outwardly a distance equal to the length of the gap 134 as the shock absorbers 140 advance the anvil 14 until the shoulder 122 engages the stop ring 120. An outer stop may be presented by a cylinder which extends forwardly beyond the forward end of the piston 12 and is attached to the jacket 22, and may be used to assure that the outward travel of the piston is limited and the piston remains within the piston guide 20.

The hydraulic cylinder is then operated to withdraw its piston 42 and bring the actuating mechanism 16 to the position shown in FIG. 4. The next firing cycle may then commence.

From the foregoing description it will be apparent that there has been provided an improved acoustic impulse generator capable of generating acoustic impulses or transients in an underwater environment. While an embodiment of the invention has been described and the dimensions and designs of parts have been shown in order to illustrate the invention and its mode of operation, it will be appreciated that variations and modifictions of the herein described apparatus, within the scope of the invention, will undoubtedly suggest themselves to those skilled in the art. Accordingly, the foregoing description should be taken merely as illustrative and not in any limiting sense.

What is claimed is:

1. For use in an acoustic impulse generator adapted to be submerged in which a piston is mounted for reciprocation in a housing in which the pressure is adapted to be lower than the pressure of the medium in which it is submerged, a mechanism for moving said piston against said pressure of said medium and then releasing said piston to generate said acoustic impulse which comprises driving means in said housing movable toward and away from said piston for moving said piston to execute a forward stroke against the pressure of said medium, roller means pivotally mounted on said driving means for engaging said piston, said piston having a surface disposed for engagement with said roller means during said forward stroke, and release means operative when said driving means moves a predetermined distance along its forward stroke for pivoting said rollerss so that they move off said piston surface and release said piston to execute a return stroke under the pressure of said medium whereby to generate the acoustic impulse.

2. The invention as set forth in claim 1 wherein said piston surface includes first and second adjacent regions, and second region being a cam surface, said roller means mounted to move from a latch position on said first region to a trip position on said second region when pivoted by said release means whereby said roller means cams over said second region to release said piston for its said return stroke.

3. The invention as set forth in claim 2 wherein said first region is of generally concave shape in which said roller means is retained while in its said latch position, and said second region is of generally convex shape over which said roller means cams when pivoted to its said trip position.

4. The invention as set forth in claim 3 wherein said piston has an internal opening into a rear end thereof which faces said housing, said surface being located in the wall of said opening with said first region closer to said rear end then said second region.

5. The invention as set forth in claim 1 wherein said driving means include a member actuable in a forward direction towards said piston, said roller means including a link having a roller mounted near one end thereof, means for pivotally mounting said link on said member, and trip means movably mounted in said member for biasing said link to pivot to a latch position to bring said roller into driving engagement with said piston.

6. The invention as set forth in claim 5 wherein said trip means includes a bar movably mounted in said member for engagement with said link to pivot said link in one sense to said latch position and in an opposite sense to a trip position where said roller is released from said piston, and a spring disposed between said bar and said member for biasing said bar to pivot said link in said one sense.

7. The invention as set forth in claim 6 wherein said release means includes a member movably mounted on said driving means member, means coupling said release means member to said bar for movement therewith, and means for limiting the movement of said release means member when said driving means moves said predetermined distance in said forward direction such that said bar engages said link and pivots it in the opposite sense to said trip position.

8. The invention as set forth in claim 7 wherein said release means member includes a collar slidably mounted on said driving means member, rod means attached at one end thereof to said collar and extending longitudinally along said drive means member, and stop means engageable with said rod means near the opposite end thereof.

9. The invention as set forth in claim 8 wherein said stop means includes a bushing through which said rod means extend, the opposite end of said rod means being enlarged to stop the travel of said rod means in the forward direction to a distance about equal to the length of said rod means.

10. The invention as set forth in claim 9 wherein said driving means includes a hydraulic cylinder and said driving means member includes the piston of said cylinder, said bushing being stationarily mounted on said cylinder.

11. The invention as set forth in claim 1 wherein said roller means includes a pair of latch arms of L shape, said driving means includes an actuator having a drive member axially movable in said housing in a forward direction toward said piston and in a return direction away from said piston, said piston having an axial opening in the rear end thereof facing said housing which presents said roller engaging surface, said surface having a cam shape inwardly convex toward the axis of said piston, said cam shape surface having a center spaced from said piston rear end, said roller being in a latch position for driving said piston when disposed on the side of said cam surface between its said center and said piston rear end and in a trip position when disposed over said center toward the piston forward end, said driving means also including a latch carrier on which said latch arms are pivotally mounted, said latch carrier being attached to the forward end of said driven member, a trip bar slidably mounted in said latch carrier, said trip bar having a groove into which one end of each of said latch arms extend, a compression spring in said latch carrier biasing said trip bar in a forward direction to pivot said latch arms and bring said roller to said latch position, said release means including a trip carrier slidably mounted on said latch carrier, a pin extending from said trip carrier through said trip bar, and rods attached to said trip carrier and extending longitudinally rearwardly along said drive member, stop means for limiting the movement of said rods and said trip carrier in a forward direction so that said bar is moved in a rearward direction to pivot said latch arms and bring said roller to said trip position.

12. The invention as set forth in claim 1 wherein there is provided, in addition to said mechanism, means for arresting the movement of said piston at the end of its return stroke which comprises an anvil movably mounted in said housing against which said piston impacts when released, yieldable means for biasing said anvil in a forward direction towards an impact position, and damping means spaced rearwardly of said impact position for engaging and damping the motion of said piston during an interval after impact when said anvil is displaced rearwardly of said impact position.

13. The invention as set forth in claim 12 including a stop member for engaging said anvil and positioning it against the bias of said yieldable means at said impact position, said damping means including a pad of resilient material, said stop member being movably mounted in said housing with the forward side thereof against said housing and the rearward side thereof against said pad, said forward side being spaced rearwardly of said impact position to form a gap between said stop member and said impact position.

14. The invention as set forth in claim 13 wherein said yieldable means is a shock absorber attached to said anvil.

* * * * *